United States Patent
Dworatzek et al.

(10) Patent No.: US 10,040,015 B2
(45) Date of Patent: Aug. 7, 2018

(54) FILTER INSERT AND METHOD FOR MANUFACTURING A FILTER INSERT

(71) Applicant: Mann+Hummel GMBH, Ludwigsburg (DE)

(72) Inventors: Klemens Dworatzek, Edingen (DE); Goekhan Evcuemen, Hanhofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 86 days.

(21) Appl. No.: 15/052,041

(22) Filed: Feb. 24, 2016

(65) Prior Publication Data
US 2016/0256813 A1 Sep. 8, 2016

(30) Foreign Application Priority Data

Mar. 3, 2015 (DE) .................. 10 2015 002 673

(51) Int. Cl.
*B01D 46/00* (2006.01)
*B01D 46/24* (2006.01)

(52) U.S. Cl.
CPC ..... *B01D 46/2414* (2013.01); *B01D 46/0001* (2013.01); *B01D 46/003* (2013.01); *B01D 46/0024* (2013.01); *B01D 46/2411* (2013.01); *B01D 2271/022* (2013.01)

(58) Field of Classification Search
CPC ............. B01D 46/00; B01D 46/0001; B01D 46/0024; B01D 46/003; B01D 46/2414; B01D 46/2411; B01D 2271/022

USPC .......................................................... 55/482
See application file for complete search history.

(56) References Cited

U.S. PATENT DOCUMENTS

| | | | | |
|---|---|---|---|---|
| 3,884,659 A | * | 5/1975 | Ray | B01D 46/02 55/379 |
| 2006/0108280 A1 | | 5/2006 | Jodi | |

FOREIGN PATENT DOCUMENTS

| | | |
|---|---|---|
| DE | 102004005210 A1 | 8/2005 |
| WO | 9628238 A1 | 9/1996 |
| WO | 2013024105 A1 | 2/2013 |

* cited by examiner

*Primary Examiner* — T. Bennett McKenzie
(74) *Attorney, Agent, or Firm* — James Hasselbeck

(57) ABSTRACT

A filter insert for installation in a housing, having at least one substantially hollow cylindrical filter element for separating liquid from aerosol; and at least one covering element designed to cover an axial end region of the filter element; wherein at least one of the the at least one covering element is formed from at least one metal sheet and connected with the filter element with at least one mechanical connection; wherein the mechanical connection between the at least one covering element and the filter element is formed solely by a structure of the at least one covering element produced through deforming or reforming the at least one covering element; wherein the structure of the at least one covering element is configured to clamp the filter element to the at least one covering element.

13 Claims, 4 Drawing Sheets

FILTER INSERT AND METHOD FOR MANUFACTURING A FILTER INSERT

TECHNICAL FIELD

The invention relates to a filter insert for installation in a housing, in particular a pressure vessel, having
- at least one filter element for separating liquid from an aerosol, in particular oil from aerosol, for example for the de-oiling of air, which is formed in a substantially hollow cylindrical manner, for example at least one cylindrically wound separator element, and
- at least one covering element, in particular at least one end plate, designed to cover an axial end region of the filter element, in particular a region of an end face of the filter element, wherein the covering element or at least one covering element is formed from sheet metal and is connected with the filter element in a purely mechanical manner, in particular free from adhesives and sealants.

The present invention further relates to a method for manufacturing a filter insert for installation in a housing, in particular a pressure vessel, wherein
- at least one hollow cylindrical filter element for separating liquid from an aerosol, in particular oil from aerosol, for example for the de-oiling of air, with
- at least one covering element for covering an axial end region of the filter element which is formed from sheet metal and connected in a manner in particular free from adhesives and sealants.

BACKGROUND OF THE INVENTION

A filter is known from WO 2013 024105 A1 for the de-oiling of air originating from an air compressor or a vacuum pump. In this filter, a sealing connection between the filter elements and a U-shaped groove of a covering element of the filter is produced through the use of an adhesive or sealant. However, the use of adhesives for fixing the filter element is expensive and additionally problematic due to the partial uncertainty of the chemical and thermal stability.

A prototypical filter insert is known from WO 96 28238 A1. In this filter insert, a filter element wound on a support tube is connected by means of a flange connection or flanging with a mounting flange of the filter housing. A flange is understood here as a connection which is produced through right-angle bending of an edge of a round or oval metal sheet. The flange connection of WO 96 28238 A1 enables the omission of an adhesion of the filter element on the end face of the filter insert. For producing this flange connection, a flange ring is arranged in the end region of the air de-oiling element. This flange ring is a separate element which is not integrated in the end face covering element of the filter insert. The flange ring itself is not flanged, but rather serves as a counter support for a bead introduced in the mounting flange and the support tube.

SUMMARY OF THE INVENTION

The object of the invention is to develop a filter insert of the aforementioned type and a method of the aforementioned type such that the filter insert is designed in a compact manner and is inexpensive and easy to manufacture.

The present invention is based on the principle of clamping the filter element on the covering element solely by means of deformation of the covering element. The deformation of the covering element is preferably performed using the technique of beading or flanging. Here, it is particularly advantageous that the mechanical connection between the covering element and the filter element takes place substantially and in particular completely by means of a form lock which prevents a disengagement in the axial direction.

In an advantageous embodiment of the present invention, a sealing, in particular gas sealing, connection between the filter element or at least one of the filter elements and the covering element or at least one of the covering elements is produced via the deformation.

The covering element may be at least one end plate formed from metal, wherein the end plate covers the end face of the filter element and at least one region of the shell surface of the filter element, and is connected with the filter element such that the pure side of the filter element is separated from the environment in a gas-tight manner.

The mechanical connection between the covering element and the filter element is formed purely through the structure of the covering element produced by the deforming or reforming of the covering element, wherein this structure is designed to clamp the filter element to the covering element in a manner secure from slipping.

The structure advantageously has at least one and preferably two covering element beads, which form a flange which is integrated into the covering element. This may extend in partial sections or completely around the covering element.

In an advantageous embodiment of the present invention, the at least one filter element is received in a U-shaped groove in the covering element, wherein in order to connect the covering element with the filter element, the two sides of this U-shaped groove have at least one covering element bead and the covering element beads are designed to hold the filter element received in the groove in a manner such that it cannot slip.

In order to achieve an optimum clamping effect, the covering element beads are advantageously arranged on mutually opposing regions of the sides of the groove.

A particularly advantageous embodiment of the present invention distinguishes itself from the prior art, in particular with respect to WO 96 28238 A1, in that a flange with two opposite beads for connecting the covering element with the filter element is integrated directly in the covering element, which forms a U-shape for this purpose at at least one location.

The covering element beads are trough-shaped depressions in the covering element and may be pressed into the covering element, for example, by machine with a beading machine using two beading rollers. Alternatively, the covering element beads may also be produced manually using a beading hammer.

In order to receive the entire axial end region of at least one of the filter elements, the groove is preferably formed substantially annularly when viewed in a section transverse to the longitudinal axis of the filter insert. In order to achieve the most uniform clamping action possible, the covering element beads advantageously encircle the entire circumference of the side of the groove.

The filter insert may have, for example, two covering elements or end plates which are each arranged on opposite axial end regions of the filter element. In the case of two covering elements, a structure with covering element beads formed by means of deforming or reforming each covering element is advantageously integrated into both covering elements.

The filter insert may have at least two filter elements, in particular at least one primary filter and at least one secondary filter. Here, for example, the axial end regions of at least two filter elements may be received in the groove, wherein each of the filter elements can be spaced apart from one another by means of at least one spacer, for example at least one insertion element. Thus, for example, only one structure may be integrated into the covering element, so that, for example, the covering element forms a U-shape at only one location.

Alternatively, the at least one covering element may have a U-shaped groove for each of the filter elements. In this embodiment, the at least one covering element forms a U-shape at at least two locations.

The at least one U-shaped groove respectively directly or indirectly, for example with the interposition of at least one support tube designed to support the filter element, abuts the outer shell surface, the inner shell surface and the upper surface of the hollow cylindrical filter element associated therewith.

In a particularly advantageous embodiment of the present invention, the following elements of the filter insert, specifically the at least one filter element,
the at least one covering element,
optionally at least one axially acting sealing element arranged in the groove,
optionally at least one metal support tube for supporting the filter element and
optionally at least one tube-formed metal protective element, in particular a grid-like, perforated metal support tube, which encloses the outer shell surface of the filter element, are connected with one another in a purely mechanical manner, wherein the connection is formed solely by a deformation of the metal elements of the filter element, in particular the covering element and optionally the support tube and/or the protective element.

In the manufacture of the filter insert, the filter element is first advantageously inserted in a U-shaped groove of the covering element and, in order to connect the filter element inserted into the groove of the covering element with the covering element, pressed with the covering element into the two sides of the groove with at least one covering element bead such that the covering element bead clamps the filter element in a manner free from slipping.

The filter insert may including two covering elements, wherein in the production of the filter insert, both covering elements are arranged on mutually opposing axial end regions of the filter element and the filter element is respectively connected on each of its axial end regions with one of the covering elements. In the present invention, both covering elements can be simultaneously connected to the filter element. In contrast thereto, in the prior art, in which the filter element is connected with the covering elements by means of adhesion, first a first axial end region of the filter insert is adhered to the covering element associated therewith, then must be waited until the adhesive is dry and only then can the opposite axial end region of the filter insert be adhered to the covering element associated therewith.

Possible applications of the invention can be found in all types of separators which are based on a wound separating medium. Currently these are, for example, oil separators with and without flanges as well as oil separation boxes, so-called spin-ons, as well as oil separators as are used for crankcase ventilation.

The term filter element is used in the context of this application to mean "filter body," and is to be understood as the part of an interchangeable filter insert arranged, for example, in a pressure vessel, which produces the separation effect. For the present invention, the filter element is advantageously designed as a filter wrap, i.e. at least one filter medium which is wound a plurality of times about an in particular perforated support tube, in particular non-woven filter material.

BRIEF DESCRIPTION OF THE DRAWINGS

As already discussed above, there are various possibilities to form and develop the present invention in an advantageous manner. Reference is made to this end to the dependent claims of claim 1 and claim 10, and in addition further embodiments, features and advantages of the present invention are explained in more detail below, with reference to the exemplary embodiments illustrated by FIGS. 1 to 4, inter alia.

Identical or similar embodiments, elements or features are provided in FIGS. 1 to 4 with identical reference characters.

DETAILED DESCRIPTION OF THE INVENTION

Figure 1:
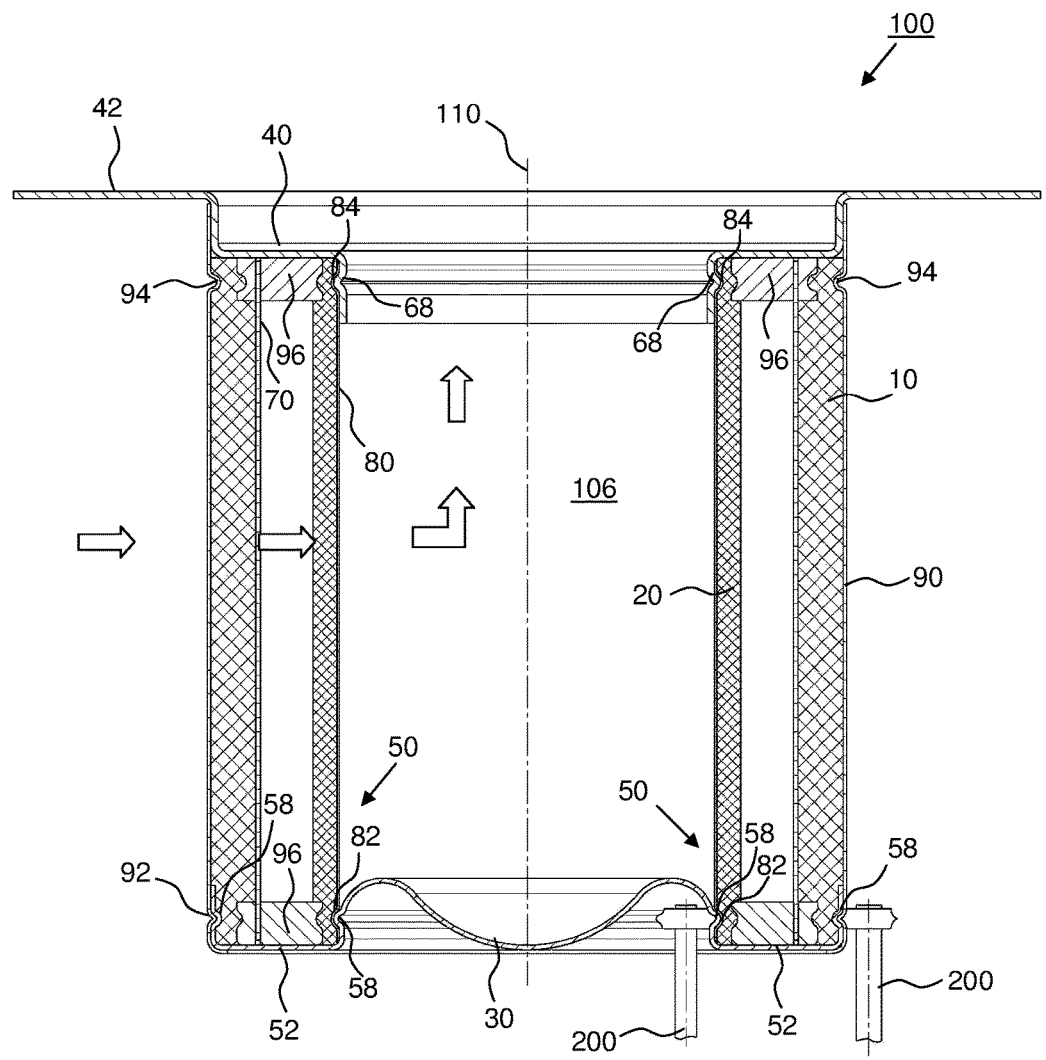
FIG. 1 shows a longitudinal section of a first embodiment of a filter insert according to the present invention, which has been manufactured according to the method according to the present invention.
Figure 2:
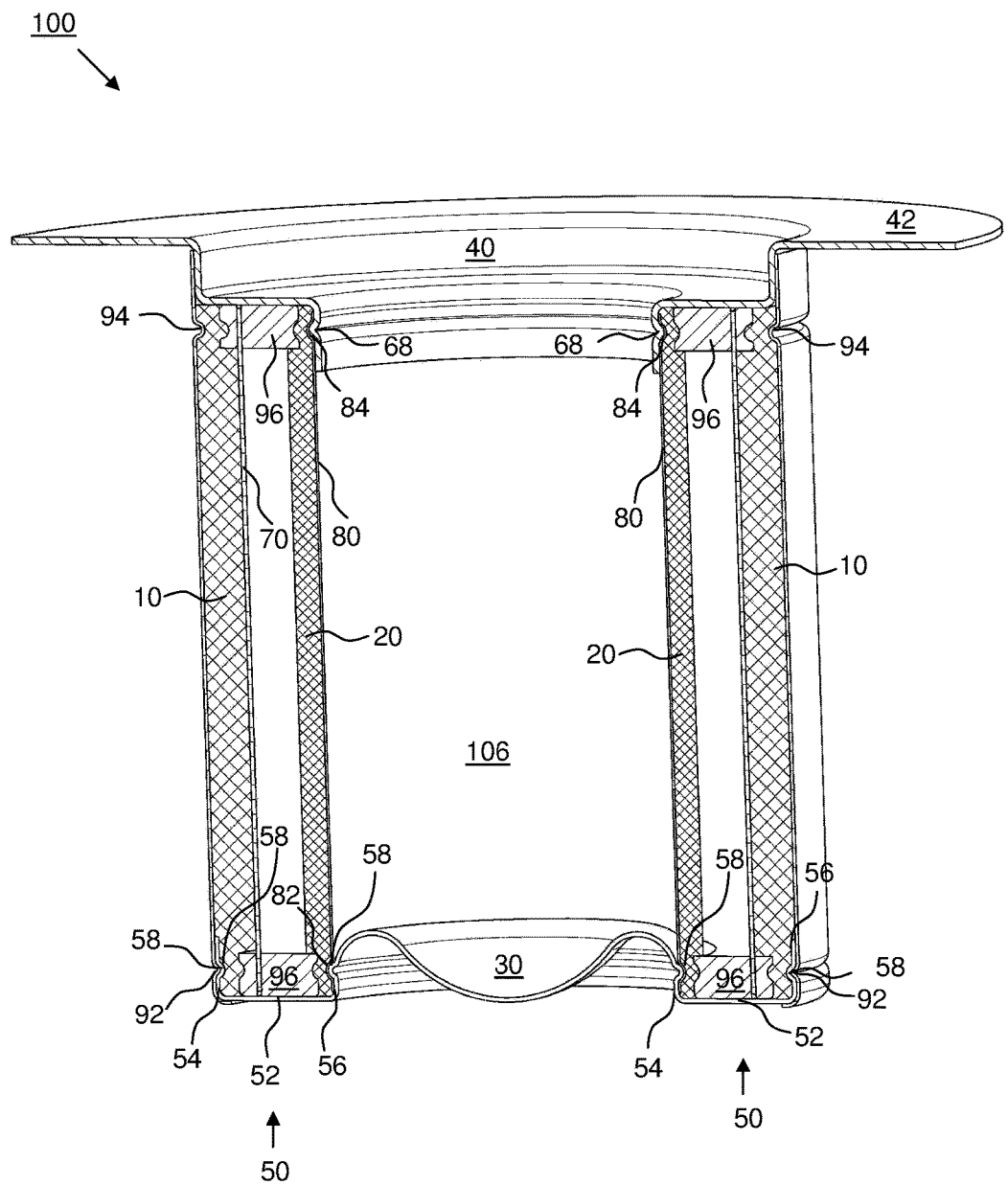
FIG. 2 shows an isometric longitudinal representation of the filter insert of FIG. 1 without the bead rollers of the beading machine.
Figure 3:
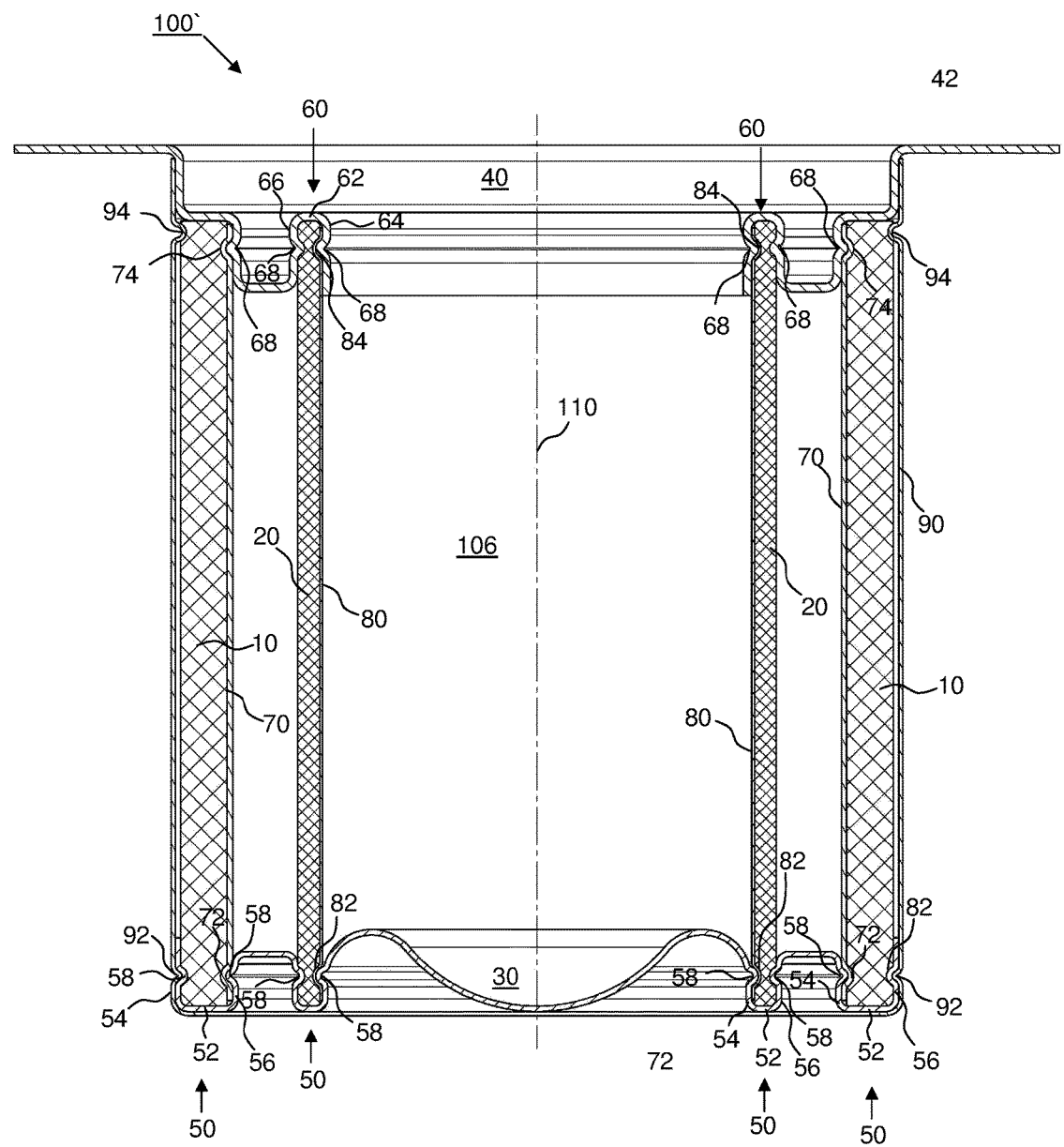
FIG. 3 shows a longitudinal section of a second embodiment of a filter insert according to the present invention, which has been manufactured according to the method according to the present invention.
Figure 4:
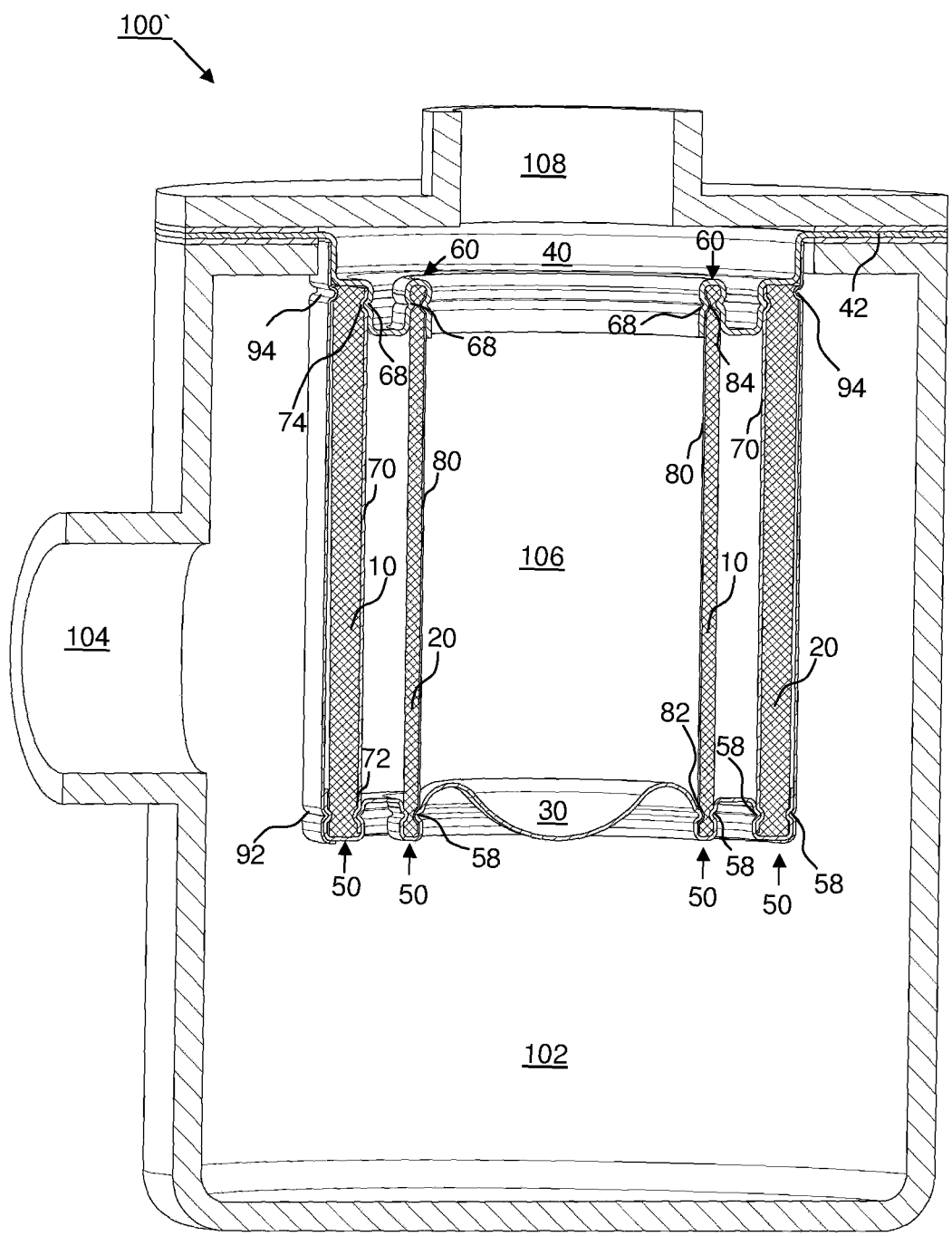
FIG. 4 shows an isometric longitudinal representation of the filter insert of FIG. 3, wherein this filter insert is installed in a housing.

To avoid unnecessary repetition, the following explanations with respect to embodiments, features and advantages of the present invention relate (insofar as not otherwise indicated) to both the filter insert 100 shown in FIGS. 1 and 2 as well as the filter insert 100' shown in FIGS. 3 and 4.

FIG. 1 shows a first embodiment of a filter insert 100 during the manufacture thereof. In the manufacturing of this filter insert 100, two hollow cylindrical filter elements 10, 20 for filtering liquid from an aerosol, namely a primary filter element 10 and a secondary filter element 20, are connected in a purely mechanical manner with covering elements 30, 40 arranged on the respective end faces of the filter elements 10, 20, namely with a first end plate 30 and a second end plate 40. The second end plate 40 is a lid designed to cover the filter insert 100. The connection between the first end plate 30 and the filter elements 10, 20 is provided solely through a deforming or reforming of the first end plate 30. Here, the end plate 30 is deformed or reformed in such a way that the filter elements 10, 20 are clamped on the end plate 30 in a manner secure from slipping.

The flow direction of the aerosol to be filtered is marked in FIG. 1 by means of arrows.

The end plate 30 has a U-shaped groove 50 for receiving the end face of the filter element 10, 20. This U-shaped groove 50 surrounds the entire annular axial end region of the hollow cylindrical filter element 10, 20.

In order to achieve an optimal filtering effect, the filter elements 10, 20 are separated from one another by at least one spacer 96, for example by at least one insertion element.

To establish the connection between the filter elements 10, 20 and the first end plate 30, at least one covering element bead 58 is pressed on the two sides of the groove 50 by means of bead rollers 200 of a beading machine such that the covering element beads 58 clamp the filter elements 10, 20 in the groove 50 in a manner secure from slipping.

FIGS. 3 and 4 show a second exemplary embodiment of a filter insert 100' of the present invention. In this second embodiment, the end plate 30 has two U-shaped grooves 50, 60. Here, one of the respective filter elements 10, 20 is inserted in the grooves 50, 60. In this embodiment, both the first covering element 30 and the second covering element 40, thus both the first end plate 30 and the cover 40, are connected with the filter elements 10, 20 solely through a deforming or reforming of the covering elements 30, 40.

In detail, for example, in a first process step (i), the filter elements 10, 20 are respectively wound about a metal support tube 70, 80 designed to support the filter elements 10, 20. So that the flow of the aerosol flowing through the filter insert is not hindered, the support tubes advantageously have perforations or holes.

In a subsequent process step (ii), the filter elements 10, 20 with the support tubes 70, 80 are inserted into the at least one groove 60 of the cover 40 of the filter insert 100. The at least one groove 60 of the cover 40 of the filter insert 100 is thus advantageously formed to also receive at least one of the support tubes 70, 80.

In a subsequent process step (iii), the first end plate 30 is placed on the axial end region of the filter elements 10, 20, wherein this axial end region lies opposite the cover 40 or the axial end region 30 of the filter elements 10, 20 inserted in the groove 60. The at least one groove 50 of the first end plate is thus advantageously formed to receive an axial end region of at least one of the filter elements 10, 20 and an axial end region of at least one of the support tubes 70, 80.

In a subsequent process step (iv), the two end plates 30, 40, i.e. the first end plate 30 and the cover 40, are connected with the filter elements 10, 20, for example simultaneously, through the pressing of the covering element beads 58, 68 by means of the technique of beading or flanging.

In the second embodiment of the filter insert 100' shown in FIGS. 3 and 4, support tube beads 72, 74, 82, 84 are pressed both into the support tube 70 arranged in the first groove 50 as well as into the support tube 80 arranged in the second groove 50. In the first embodiment of a filter insert 100 shown in FIGS. 1 and 2, in which both support tubes are arranged in the same groove 50, support tube beads 82, 84 are pressed only into the support tube 80 arranged on the second filter element 20. The support tube beads 72, 74 and 82, 84 are designed to interact with the covering element beads 58 and 68 of the groove 50 or 60 such that the filter element 10, 20 clamps in the groove 50 or 60. As shown in FIG. 1, the support tube bead 72, 82 can directly abut the covering element bead 58, 68 of the end plate 30, 40 associated therewith, in particular such that the beads interlock in a form-locking manner.

For easier handling of the filter element 100 or 100', as well as for the protection of a shell surface of the first filter element 10 opposite an inner cavity 106 of the filter insert 100 designed for discharging the purified gas or for supplying the aerosol to be purified, a tube-shaped metal protective element 90, in particular a grid-like perforated metal protective tube, may be arranged about the shell surface of the first filter element 10 and clamped on the shell surface of the first filter element 10 by means of the technique of beading or flanging. As shown in FIGS. 1 to 4, the protective element 90 may thus include at least one in particular circumferential protective element bead 92, 94, wherein the protective element bead 92, 94 is designed to clamp the support element 90 on the outermost shell surface of the filter elements 10, 20 in a manner secure from slipping.

In the first exemplary embodiment of a filter insert 100 shown in FIGS. 1 and 2, a protective element bead 94 arranged in the region of the cover 40 interacts with an opposite covering element bead 68 such that the two filter elements 10, 20 are clamped between this protective element bead 94 and the opposite covering element bead 68.

In the second exemplary embodiment of a filter insert 100' shown in FIGS. 3 and 4, a protective element bead 94 arranged in the region of the cover 40 interacts with an opposite covering element bead 68 such that the first filter element 10 is clamped between this protective element bead 94 and the opposite covering element bead 68.

For sealing the connection between the filter elements 10, 20 and the cover 40, at least one axially acting sealing element can be applied, in particular sprayed or laid, onto the bottom of the U-shaped groove 60 of the cover 40, for example after clamping of the metal support element 90 to the outermost shell surface of the filter elements 10, 20.

In short, an advantageous embodiment of the method of the present invention includes the following process steps:
(i) Winding the filter material of the filter elements 10, 20, in particular a non-woven fabric, onto metal support tubes 70, 80;
(ii) Inserting the support tubes 70, 80 into the metal cover 40, in particular in the U-shaped groove 60 of the metal cover 40;
(iii) Placing the metal end plate 30 with its at least one U-shaped groove 50 onto the end face of the filter element 100 or 100' which is opposite the cover 40;
(iv) Connecting the non-woven fabric winding 10, 20 with the end plate 30 by means of beading and simultaneously connecting the non-woven fabric winding 10, 20 with the cover 40 by means of beading;
(v) Optionally arranging the metal protective element or protective screen 90 about the outermost non-woven fabric winding 10, then beading once again; and
(vi) Optionally applying a sealing element to the cover 40.

In the two embodiments of a filter insert 100, 100' shown in FIGS. 1 to 4, all elements of these filter inserts 100, 100' including all separating media are connected with one another exclusively mechanically and without the use of adhesives or sealants. All elements of the filter inserts 100, 100' are connected with one another by means of at least one clamping connection, wherein the clamping connection is formed solely by means of a deformation of the metal elements of the filter inserts 100, 100'. The deformation of the metal elements takes place by means of the technique of beading or flanging. Here, the covering elements 30, 40, the support tubes 70, 80 and the protective element 90 are beaded or flanged.

REFERENCE CHARACTERS

10 filter element, in particular primary filter element
20 additional filter element, in particular secondary filter element
30 covering element, in particular end plate, for covering an axial end region, in particular a front region or covering surface, of the filter element 10, 20

40 second or additional covering element, in particular second or additional end plate, for example cover, for covering a further axial end region, in particular an additional front region or additional covering surface, of the filter element 10, 20
42 fixing flange for fixing the filter insert 100, 100' in the housing 102
50 in particular U-shaped groove of the covering element 30
52 bottom of the U-shaped groove 50 of the covering element 30
54 first side of the U-shaped groove 50 of the covering element 30
56 second side of the U-shaped groove 50 of the covering element 30
58 covering element bead, in particular covering element bead gutter-like channel or depression, of the U-shaped groove 50 of the covering element 30
60 U-shaped groove of the additional covering element 40
62 bottom of the U-shaped groove 60 of the additional covering element 40
64 first side of the U-shaped groove 60 of the additional covering element 40
66 second side of the U-shaped groove 60 of the additional covering element 40
68 further covering element bead, in particular gutter-like channel or depression, of the U-shaped groove 60 of the additional covering element 40
70 support tube, in particular central tube, for supporting the filter element 10
72 support tube bead, in particular first support tube bead, for example gutter-like channel or depression, of the support tube 70
74 additional support tube bead, for example gutter-like channel or depression, of the support tube 70
80 additional support tube, in particular additional central tube, for supporting the additional filter element 20
82 support tube bead, in particular support tube bead, for example gutter-like channel or depression, of the additional support tube 80
84 additional support tube bead, in particular gutter-like channel or depression, of the additional support tube 80
90 tube-shaped metal protective element, in particular grid-like perforated metal protective tube
92 protective element bead
94 additional protective element bead
96 spacer, for example insertion element
100 filter insert of the first embodiment (see FIGS. 1 and 2)
100' filter insert of the second embodiment (see FIGS. 3 and 4)
102 housing, in particular pressure vessel
104 central flow opening, in particular inflow opening for the aerosol to be filtered
106 inner cavity of the filter insert 100
108 outflow opening for the filtered purified fluid, in particular purified air
110 longitudinal axis of the filter insert 100
200 bead rollers of a first beading machine

The invention claimed is:
1. A filter insert for installation in a housing, comprising:
at least one substantially hollow cylindrical filter element for separating liquid from aerosol; and
at least one covering element designed to cover an axial end region of the filter element;
wherein at least one of the at least one covering element is formed from at least one metal sheet and connected with the filter element with at least one mechanical connection;
wherein the mechanical connection between the at least one covering element and the filter element is formed solely by a structure of the at least one covering element produced through deforming or reforming the at least one covering element;
wherein the structure of the at least one covering element is configured to clamp the filter element to the at least one covering element;
wherein the structure of the at least one covering element has at least one groove which is substantially U-shaped when seen in a section along a longitudinal axis of the filter insert and at least one radial covering element bead, which is arranged on one of two sides of the at least one groove;
wherein in a position of use of the filter insert:
the at least one groove receives the axial end region of at least one of the filter elements;
the bottom of the at least one groove abuts directly or indirectly against the axial end region of the filter element received in the groove and the two sides of the at least one groove extend parallel to a shell surface of the filter element received in the at least one groove; and
the at least one covering element bead clamps the filter element received in the at least one groove into the at least one groove in a manner secure from slipping;
wherein the covering element is connected to the filter element in a mechanical manner;
wherein the structure of the at least one covering element each has a respective covering element bead arranged on each of the two sides of the at least one groove, which covering element bead clamps the filter element received in the at least one groove into the at least one groove in a manner secure from slipping.
2. The filter insert according to claim 1, wherein the covering element beads are arranged on mutually opposite regions for the sides of the at least one groove.
3. The filter insert according to claim 1, wherein
when seen in a section transverse to the longitudinal axis of the filter insert, the at least one groove is formed in a substantially annular manner and the covering element bead or covering element beads encircle the entire circumference of the sides of the at least one groove.
4. The filter insert according to claim 1, wherein
at least one metal support tube designed to support the filter element;
wherein the at least one groove is additionally formed to receive the support tube or at least one of several support tubes; and
wherein the support tube has at least one support tube bead, which is designed to interact with the covering element bead or covering element beads of the at least one groove such that the filter element clamps in the at least one groove, the support tube bead directly abutting one of the covering element beads, such that the beads engage with one another in a form locking manner.
5. The filter insert according to claim 1, wherein
the axial end regions of at least two filter elements are received in the at least one groove, wherein the axial end regions of the respective filter elements are spaced apart from one another by at least one spacer configured as at least one insertion element, the at least one insertion element is arranged radially between the axial end regions of the of the respective filter elements.

6. The filter insert according to claim 1, wherein
the filter element has a support tube for supporting the filter element arranged on an inner shell surface of the filter element;
wherein the filter element is two filter elements: a primary filter and a secondary filter;
wherein the at least one of the covering element is has a U-shaped groove for each of the filter elements; and
wherein the U-shaped groove directly or indirectly abuts respectively against an outer shell surface, the inner shell surface and a covering surface of the hollow cylindrical filter element associated therewith.

7. A method for manufacturing a filter insert according to claim 1 for installation in a housing, wherein
at least one hollow cylindrical filter element for separating a liquid from an aerosol is connected in a purely mechanical manner with at least one covering element designed to cover an axial end region of the filter element and formed from at least one metal sheet;
wherein the connection between the covering element and the filter element is provided solely through the deforming or reforming of the covering element;
wherein the covering element is deformed such that the filter element is clamped on the covering element.

8. The method according to claim 7, wherein
the filter element is inserted into at least one U-shaped groove of the covering element; and
the covering element is connected with the filter element inserted into the groove, in that at least one respective covering element bead is pressed on both sides of the groove such that the covering element beads clamp the filter element in the groove.

9. The method according to claim 8, wherein
the filter insert comprises two covering elements, wherein both covering elements are arranged on mutually opposite axial end regions of the filter element;
the filter element is respectively connected at each of its axial end regions with one of the covering elements; and
both of the covering elements are simultaneously connected with the filter element by means of a beading technique.

10. The method according to claim 9, wherein
the filter element is wound about a metal support tube for supporting the filter element;
wherein the filter element is inserted with the support tube into the groove of the second covering element;
wherein the first covering element is placed on the axial end region of the filter element which is opposite the second covering element;
wherein through pressing of the covering element beads by means of the beading technique, the second covering element is connected with the filter element and the first covering element is connected with the filter element.

11. The method according to claim 10, wherein
following the pressing of the covering element beads, a tube-shaped metal protective element configured as a grid-like perforated metal protective tube is arranged around the outer shell surface of the filter element facing away from the inner cavity of the filter insert for discharging the purified gas or for supplying the aerosol to be purified, or the outermost shell surface of the filter element furthest away from the inner cavity, and subsequently by the beading technique clamped on the outer shell surface of the filter element or on the outermost shell surface of the filter elements.

12. A filter insert installation in a housing, comprising:
at least one substantially hollow cylindrical filter element for separating liquid from aerosol; and
at least one covering element designed to cover an axial end region of the filter element;
wherein at least one of the at least one covering element is formed from at least one metal sheet and connected with the filter element with at least one mechanical connection;
wherein the mechanical connection between the at least one covering element and the filter element is formed solely by a structure of the at least one covering element produced through deforming or reforming the at least one covering element;
wherein the structure of the at least one covering element is configured to clamp the filter element to the at least one covering element;
wherein the structure of the at least one covering element has at least one groove which is substantially U-shaped when seen in a section along a longitudinal axis of the filter insert and at least one radial covering element bead, which is arranged on one of two sides of the at least one groove;
wherein in a position of use of the filter insert:
  the at least one groove receives the axial end region of at least one of the filter elements;
  the bottom of the at least one groove abuts directly or indirectly against the axial end region of the filter element received in the groove and the two sides of the at least one groove extend parallel to a shell surface of the filter element received in the at least one groove; and
  the at least one covering element bead clamps the filter element received in the at least one groove into the at least one groove in a manner secure from slipping;
  wherein the covering element is connected to the filter element in a mechanical manner;
wherein the filter element has a support tube for supporting the filter element arranged on an inner shell surface of the filter element;
wherein the filter element is two filter elements: a primary filter and a secondary filter;
wherein the at least one of the covering element is has a U-shaped groove for each of the filter elements; and
wherein the U-shaped groove directly or indirectly abuts respectively against an outer shell surface, the inner shell surface and a covering surface of the hollow cylindrical filter element associated therewith;
wherein at least one tube-shaped metal protective element is configured as a grid-like perforated metal protective tube, which completely surrounds the outer shell surface of the filter element facing away from an inner cavity of the filter insert for discharging the purified gas or for supplying the aerosol to be purified, or an outermost shell surface of the filter element furthest away from the inner cavity;
wherein the protective element has at least one circumferential protective element bead; and
wherein the protective element bead is designed to clamp the protective element on the outer shell surface of the filter element or the outermost shell surface of the filter element in a manner secure from slipping.

13. The filter insert according to claim 12, wherein
the protective element bead or at least one of the protective element beads is designed to interact with at least one of the covering element beads such that the covering element is clamped in the protective element such that the protective element beads or at least one of the protective element beads abuts directly against one of the covering element beads.

* * * * *